United States Patent
Røed et al.

(10) Patent No.: US 7,176,795 B2
(45) Date of Patent: Feb. 13, 2007

(54) METHOD AND A DEVICE FOR PROTECTION OF PERSONNEL

(75) Inventors: Frode Røed, Stavanger (NO); Sigve Sandvik, Sandnes (NO)

(73) Assignee: National Oilwell Norway AS (NO)

( * ) Notice: Subject to any disclaimer, the term of this patent is extended or adjusted under 35 U.S.C. 154(b) by 22 days.

(21) Appl. No.: 10/509,916

(22) PCT Filed: Apr. 3, 2003

(86) PCT No.: PCT/NO03/00108

§ 371 (c)(1),
(2), (4) Date: Feb. 9, 2005

(87) PCT Pub. No.: WO03/085472

PCT Pub. Date: Oct. 16, 2003

(65) Prior Publication Data

US 2005/0140513 A1   Jun. 30, 2005

(30) Foreign Application Priority Data

Apr. 4, 2002   (NO) ................................. 20021582

(51) Int. Cl.
*G08B 13/14* (2006.01)
(52) U.S. Cl. ............... 340/568.1; 340/572.1; 340/679; 340/539.15
(58) Field of Classification Search ............ 340/568.1, 340/572.1, 573.4, 679, 539.15
See application file for complete search history.

(56) References Cited

U.S. PATENT DOCUMENTS

| 4,025,922 | A |   | 5/1977 | Trawick, III |
| 5,107,705 | A | * | 4/1992 | Wraight et al. ........... 73/152.03 |
| 5,115,223 | A | * | 5/1992 | Moody ..................... 340/573.1 |
| 5,225,809 | A |   | 7/1993 | Bunn |
| 5,513,854 | A |   | 5/1996 | Daver |
| 6,239,833 | B1 | * | 5/2001 | Ozaki et al. ................ 348/159 |
| 6,621,418 | B1 | * | 9/2003 | Cayrol ..................... 340/573.1 |
| 6,897,783 | B2 | * | 5/2005 | Zeng et al. ................. 340/635 |
| 6,979,813 | B2 | * | 12/2005 | Avril ........................... 250/221 |

FOREIGN PATENT DOCUMENTS

| FR | 2382886 | 10/1978 |
| GB | 1543910 | 4/1979 |
| WO | WO 98/16517 | 6/1998 |
| WO | WO 98/38554 | 9/1998 |

OTHER PUBLICATIONS

Patent Abstracts of Japan, AP 10-320673, Safety Monitor System, Mitsunori, Dec. 4, 1998.
Derwent Publications, AN 1988-107531 & JP 63-107235A ((Nide) NEC Corp.), May 15, 1988, Abstract.
Derwent Publications, AN 1995-219511 & JP 71-31392 ((Fuit) Fujitsu ltd.), May 19, 1995, Abstract.
Derwent Publications, AN 2001-187533 & JP 3245230B2 ((Mira-N) Miral Gijutsu Kenkyusho KK), Jan. 7, 2002.

* cited by examiner

*Primary Examiner*—Jeffery Hofsass
*Assistant Examiner*—Samuel Walk
(74) *Attorney, Agent, or Firm*—Andrus, Sceales, Starke & Sawall, LLP

(57) ABSTRACT

A method and a device for determining if or where a person (10) is located within an area (5), wherein a foot transceiver (8) connected to the person (10) activates one or several identifiable transponders (6) placed in the area (5), after which the activated transponder(s) (6) emit an identifiable signal, preferably via the foot transceiver (8), onto a main receiver/transmitter (14), each of the received signals then being referred to a known position.

18 Claims, 3 Drawing Sheets

METHOD AND A DEVICE FOR PROTECTION OF PERSONNEL

CROSS REFERENCE TO RELATED APPLICATION

The present application is the U.S. national stage application of International Application PCT/NO03/00108, filed Apr. 3, 2003, which international application was published on Oct. 16, 2003 as International Publication WO 03/085472. The International Application claims priority of Norwegian Patent Application 20021582, filed Apr. 4, 2002.

This invention concerns a method of preventing people from becoming exposed to injury from tools and machines. More particularly, it concerns a method for determining if a person is located within the working range of the particular machine, thereby enabling the stopping of the machine prior to danger arising. The method is well suited for preventing personal injury from automatically controlled machines on a drill floor. This invention also concerns a device for practising the invention.

When using remotely controlled and/or automatically controlled machines, a person may be exposed to danger when located within the working range of the machine.

To overcome this danger, restricting the working range of the machine by means of, for example, a shield or a gate has commonly been used. It is also known to stop machines of this type by means of light rays being interrupted when a person enters the path of the light rays, or by means of a pressure-sensitive mat providing a signal when a person steps onto the mat.

At larger, remotely controlled and/or automated installations, restricting the freedom of personnel movement by means of, for example, shields becomes unpractical. This may be due to several machines operating within the same space and occasionally overlapping one another, and in such a way that shielding of one machine prevents another machine from performing an operation.

Under such conditions it may also be impractical to use a light-based device, inasmuch as the light used for detecting personnel inadvertently may be interrupted by machines in the area, or by the device being soiled. On a drill floor, such as that known from petroleum activities, several cooperating machines are being moved and are operating, for example, at the rotary table of the drill floor.

Current and prospective regulations concerning work near automated machines establish requirements for protection of areas at which machines of this type operate.

SUMMARY OF THE INVENTION

The object of the invention is to remedy the disadvantages of the prior art.

According to the invention, the object is achieved by means of the features disclosed in the specification below and in the subsequent patent claims.

In order to determine if and where a person is located within an area, a foot transceiver connected to a person activates one or several identifiable transponders placed in the area, after which the activated transponders emit an identifiable signal, preferably via the foot transceiver, onto a main receiver/transmitter. Each received signal then may be referred to a known position.

For example, the foot transceiver may be placed in the person's shoe sole or at another suitable place on the body. In a preferred embodiment, the foot transceiver is of a type that may be charged inductively, thereby not requiring external connection. The foot transceiver is configured to transmit/receive magnetic and/or electromagnetic signals, and the foot transceiver may be configured to be "sleeping", but it is "woken up" by means of, for example, a signal from the main receiver/transmitter.

Transponders are placed in the area of interest, and preferably at a relatively small mutual distance. A distance of 10–20 centimeters has proven practical, and advantageously the transponders, which preferably are of a type without wire connections, may be imbedded in a floor coating.

As compared to the distance between transponders, the transmitter operates within a small range. Thus, one to four transponders will normally be active simultaneously while a person walks across a floor.

When a foot transceiver enters within a predetermined distance of a transponder, the transponder is activated by means of energy from the foot transceiver. The transponder transmits a code to the foot transceiver, which forwards the code in a recognizable format to the main receiver/transmitter. The code is identifiable, enabling thus to determine which transponder is activated. Each transponder position is known, and thus it becomes relatively simple to determine where the foot transceiver, hence the person, is located.

By linking information concerning the person's whereabouts to the control system of a machine, the machine may be stopped when the person is located within a zone of danger.

It may prove appropriate to coordinate the method according to the invention with, for example, a photocell or a movement detector placed at the entrance of the area of interest, whereby a warning will be provided, or possibly that the machine is stopped if a person not provided with a foot transceiver enters the area.

Transponders preferably are configured in a manner allowing reprogramming of a transponder's signal code by means of a signal coming from the main receiver/transmitter.

Determination of position according to the method is not significantly disturbed by machine movements or by irrelevant signals. At the same time, the method is simple and reliable.

BRIEF DESCRIPTION OF THE DRAWINGS

Hereinafter a non-limiting example of a preferred embodiment is described and being illustrated in the accompanying drawing, where.

DETAILED DESCRIPTION OF THE INVENTION

Figure 1:
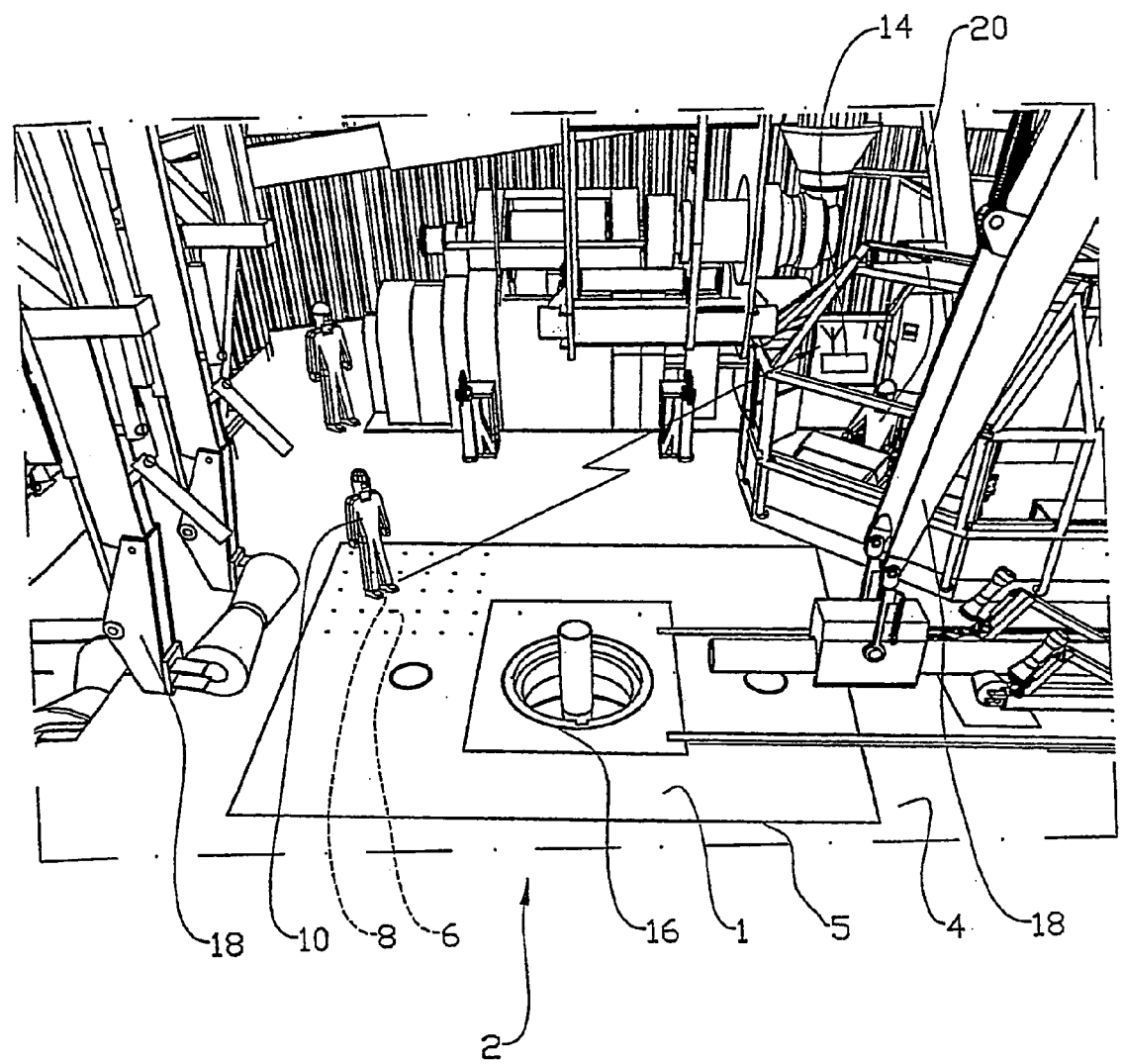
FIG. 1 shows a perspective sketch of a drill floor on which a person is located within a supervised area.

On the drawings the reference numeral 1 denotes a floor coating formed as a mat placed on the floor 4 of the drill floor 2.

A number of transponders 6 of known type are embedded in the floor coating 1 at a suitable, mutual distance, the transponders 6 being provided with a receiver component, a signal-generating component and a transmitter component. The energy required to emit a signal from the transponder 6 is provided by a foot transceiver 8 placed in a shoe sole 12 of a person 10.

Besides an accumulator, the foot transceiver 8, also of known configuration, is provided with a circuit for generating a magnetic and/or electromagnet field and a circuit for receiving such signals. The foot transceiver 8 is configured for inductive charging and thus may be closely embedded in the shoe sole 12.

When the person 10 is located within a predetermined distance of one of the transponders 6, the foot transceiver 8 activates the transponder 6, the transponder 6 thereby transmitting an identifiable signal back to the foot transceiver 8, which forwards the signal onto a main receiver/transmitter 14.

The position of each individual transponder 6 is known, and when the transponder 6 of interest transmits its identifiable signal via the foot transceiver 8 and the main receiver/transmitter 14 refers the signal to the current position, the position of the person 10 may be determined, generally by means of several transponders 6 activated simultaneously.

On a drill floor 2 the floor coating 1 containing the transponders 6 is placed on the floor 4 within an area 5 at the drill floor rotary table 16, and in such a way that it also covers the working range of the pipe handling machines 18 of interest.

Figure 2:
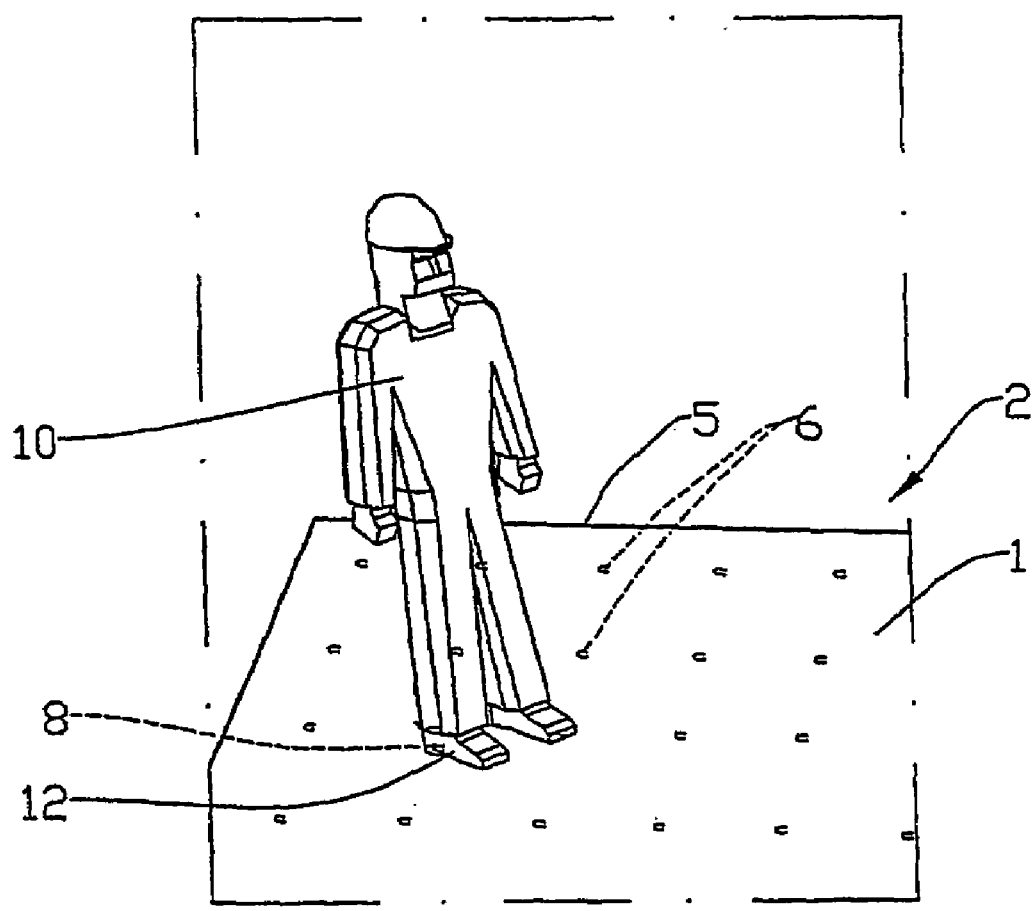
FIG. 2 shows in a larger scale a section of FIG. 1.
Figure 3:
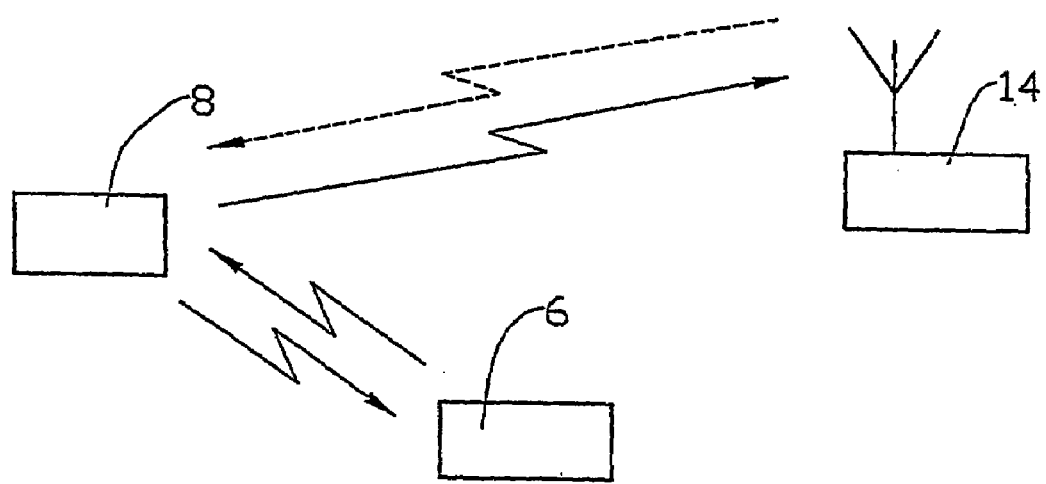
FIG. 3 shows a flow chart of the method according to the invention.

When a person 10 enters onto the floor coating 1, cf. FIG. 1, the transponders 6 will be activated by the foot transceiver 8 placed in the shoe sole 12 of the person 10, cf. FIG. 2. The one or several transponders 6 transmit(s) its/their identifiable signal(s) via the foot transceiver 8 and onto the main receiver/transmitter 14, whereupon the transponder(s) 6 being activated may be determined. The positions of the individual transponders 6 are known. Thus the position of the person 10 on the drill floor 2 also is known. An operator 20 may receive an overview of the position(s) of person(s) 10 on the drill floor 2 via, for example, a screen. The control system of the pipe handling machines 18 may be provided with information concerning the position of the person 10, and, for example, be programmed to stop if the person 10 enters the working range of the machine 18.

The method also is well suited for determining the position of other objects than persons.

The invention claimed is:

1. A device for identifying the location of a person in a working area for a machine and for preventing injury to the person, the device comprising:
    a plurality of stationary transponders, the transponders being spaced apart over at least the working area, the transponders arranged to emit an identifiable, location-specific signal when activated;
    a transceiver coupled to the person, the transceiver arranged to activate one or more of the plurality of stationary transponders when the transceiver is located within a predetermined distance from said one or more of the plurality of stationary transponders, the transceiver further arranged to receive and transmit the identifiable, location-specific signal of each activated transponder;
    a receiver/transmitter arranged to receive the identifiable, location-specific signal from each activated transponder via the transceiver, and to transmit the identifiable location-specific signal to a controller for the machine;
    wherein the controller for the machine is arranged to identify the location of a person located in the area of the plurality of spaced-apart transponders based upon the received identifiable location-specific signal(s), and to stop the machine if the person is located within the working area.

2. The device according to claim 1, wherein the transponders are spaced apart along a floor area near the machine.

3. The device according to claim 1, wherein the transceiver is coupled to a foot of the person.

4. The device according to claim 3, wherein the transceiver is coupled to a shoe sole on the person's foot.

5. The device according to claim 3, wherein the transceiver is coupled to an ankle of the person.

6. The device according to claim 1, wherein the transponders comprise a signal code that is reprogrammable.

7. The device according to claim 6, wherein the signal code is reprogrammable by means of a signal from the receiver/transmitter.

8. The device according to claim 1, comprising a plurality of transceivers coupled to the person.

9. The device according to claim 1, wherein the transceiver is of a type that can be inductively charged.

10. The device according to claim 2, wherein the transponders are spaced apart a distance of about 10–20 centimeters.

11. The device according to claim 1, wherein the transponder is activated by means of energy emitted from the transceiver.

12. The device according to claim 1, further comprising a display arranged to display the identified location of the person.

13. A method for identifying the location of a person in a working area for a machine and for preventing injury to the person, the method comprising the steps of:
    providing a plurality of stationary transponders, the transponders being spaced apart over at least the working area, the transponders arranged to emit an identifiable, location-specific signal when activated;
    providing a transceiver coupled to the person, the transceiver arranged to activate one or more of the plurality of stationary transponders when the transceiver is located within a predetermined distance from each of said one or more of the plurality of stationary transponders, the transceiver further arranged to receive and transmit the identifiable, location-specific signal of each activated transponder;
    providing a receiver/transmitter arranged to receive the identifiable, location-specific signal from each activated transponder via the transceiver and to transmit the signal to a controller;
    operating the controller to identify the location of a person in the area of the spaced-apart transponders based on the location-specific signal(s) and to stop the machine if the person is located within the working area.

14. The method of claim 13, further comprising the step of displaying the identified location of the person on a display.

15. A device to prevent that a person located within at least one machine's working area, is subjected to an injury from the at least one machine, the device including:
    multiple fixed identifiable transponders individually spaced apart placed over an area, the transponders being designed to send an identifiable signal when activated;
    at least one transceiver connected to a person's foot where the transceiver is capable of activating adjacent transponders, and transmit signals from the activated transponders;
    a main receiver/transmitter that is designed to receive the identifiable signal from the activated transponders through the at least one transceiver and refer each activated transponder to its individual position; and where the at least one machine is stopped if one of the activated transponders is located within the working area of the at least one machine.

16. The device according to claim 15, wherein the transponders are configured to allow reprogramming of a transponders signal code by means of a signal coming from the main receiver/transmitter.

17. A device according to claim 15, wherein the foot transceiver is placed in the shoe sole of the person.

18. A device according to claim 15, wherein the foot transceiver is placed at the ankle of the person.

* * * * *